United States Patent [19]

Faccia

[11] Patent Number: 5,072,825
[45] Date of Patent: Dec. 17, 1991

[54] DRAWING AND CONVEYING ARM

[76] Inventor: Tiziano Faccia, Via Padova 102, 35026 Conselve (Prov. Padova), Italy

[21] Appl. No.: 541,697

[22] Filed: Jun. 21, 1990

[30] Foreign Application Priority Data

Jun. 28, 1989 [IT] Italy ............................... 41643 A/89

[51] Int. Cl.⁵ ............................................. B65G 65/22
[52] U.S. Cl. .................................... 198/513; 198/518
[58] Field of Search ................................. 198/513, 518

[56] References Cited

U.S. PATENT DOCUMENTS

| | | | |
|---|---|---|---|
| 2,529,180 | 11/1950 | Oehler | 198/513 |
| 3,509,699 | 5/1970 | Calder | 198/513 X |
| 4,230,221 | 10/1980 | Beresinsky | 198/513 |
| 4,848,844 | 7/1989 | Weiss | 198/513 X |
| 4,957,198 | 9/1990 | Miller et al. | 198/513 |

*Primary Examiner*—Joseph E. Valenza
*Assistant Examiner*—Keith L. Dixon
*Attorney, Agent, or Firm*—Guido Modiano; Albert Josif

[57] ABSTRACT

A drawing and conveying arm includes a box-like duct which is internally provided with a conveyor belt and has, at one end, a wide drawing inlet in which a mill for drawing and cutting material is located. The opposite end of the arm is articulated to a container for the drawn material and/or to a supporting framework. The improved drawing and conveying arm also includes a second counter-rotating mill which is provided in the drawing inlet in a position which is parallel and proximate to the first mill. Both mills can conveniently be removed to load for example farinaceous products.

5 Claims, 3 Drawing Sheets

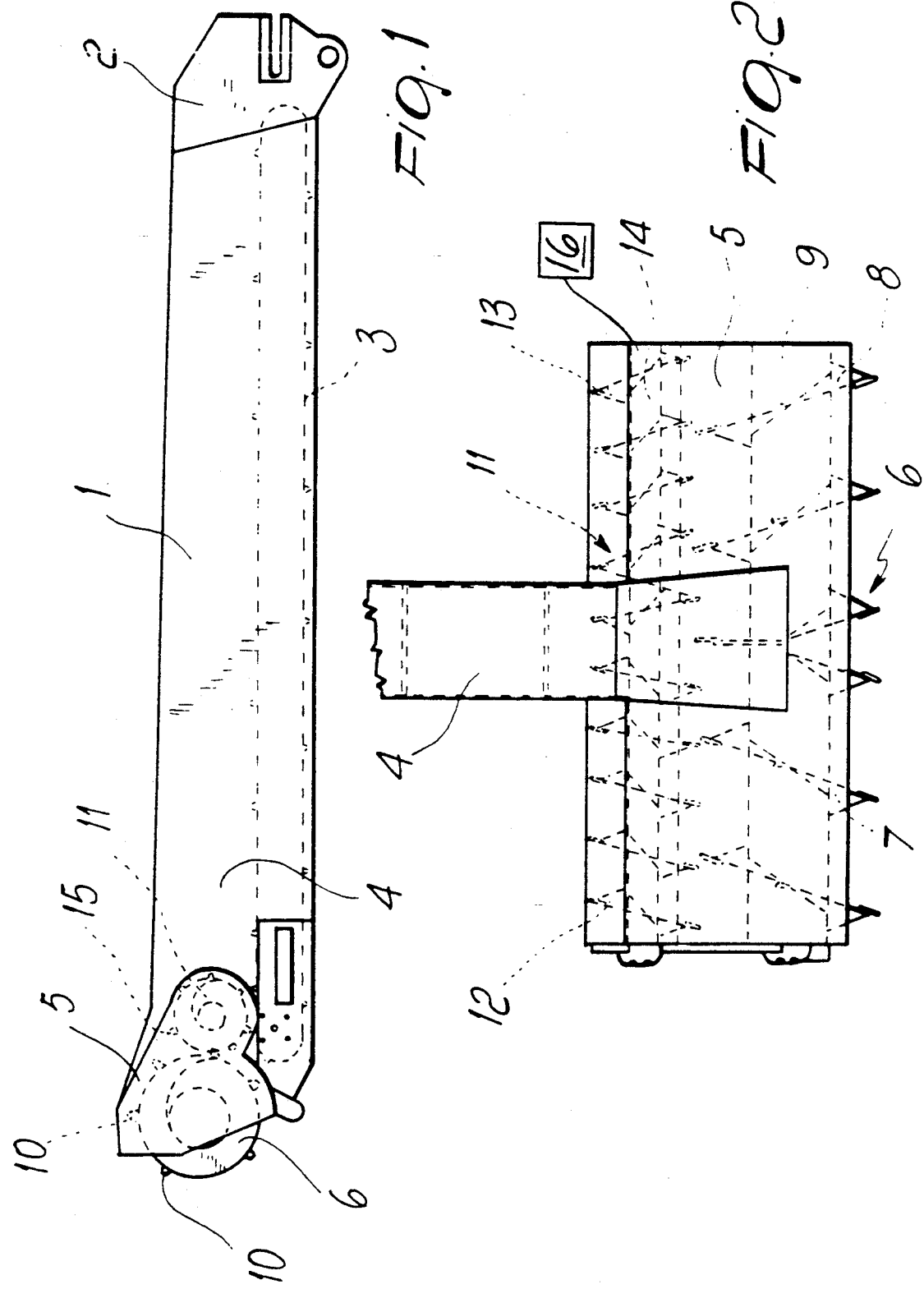

DRAWING AND CONVEYING ARM

BACKGROUND OF THE INVENTION

The present invention relates to an improved drawing and conveying arm which can be used for example in zootechny to load machines for mixing and distributing animal fodder.

Drawing and conveying arms are known and currently commercially available; each arm is constituted by a box-like duct in which the material which is drawn and cut by a terminal mill is conveyed and sent by a conveyor belt having an end connected to a mixing machine for loading thereof.

Said mill is constituted by two opposite scrolls welded on a single shaft which is arranged perpendicular to said arm so as to draw the material toward the center.

Said scrolls are peripherally provided with cutters for cutting and removing the drawn product.

The fibrous nature of the products to be drawn entails, however, problems for the mill regarding both removal and loading onto the belt.

The action of the cutters is in fact often insufficient in order to obtain satisfactory shredding, and the material often entangles around the scrolls that become clogged thereby compromising the operation.

The conveyance action of the scrolls is also often insufficient for a satisfactory loading of the conveyor belt.

Drawing and conveying arms are known, which are provided with a second mill inside the box-like structure, above the conveyor belt, in the inlet region; said second mill has the purpose of shredding the material, facilitating its conveyance.

This however has turned out to be a contrivance for merely reducing the problems but has not eliminated them.

Said known arms are furthermore designed and built so as to be adapted to load exclusively fibrous products which however are only some of the materials to be mixed in order to form animal fodder.

SUMMARY OF THE INVENTION

The aim of the present invention is to provide an improved drawing and conveying arm which overcomes the disadvantages described above in the known art.

A consequent primary object is to provide a drawing and conveying arm adapted to load both fibrous and farinaceous or granular products.

Another important object is to provide a drawing and conveying arm having a simple structure and which may be easily produced.

Not least object is to produce the arm with low costs with conventional production systems.

This aim, these objects and others which will become apparent hereinafter are achieved by an improved drawing and conveying arm comprising a box-like duct having internal conveyor means, and provided at one end with a drawing inlet, said inlet being provided with a first mill for drawing and cutting material, an opposite end being articulated to a container for the drawn material or to a supporting framework, characterized in that it comprises a second counter-rotating rotor element which is provided in said inlet in a parallel position proximate to said first mill, said first mill and said second rotor element being removable for drawing farinaceous products by means of said drawing inlet alone, which acts as a scoop.

BRIEF DESCRIPTION OF THE DRAWINGS

Further characteristics and advantages of the invention will become apparent from the detailed description of some embodiments thereof, illustrated only by way of non-limitative example in the accompanying drawings, wherein:

FIG. 1 is a schematic side view of a first embodiment of the drawing and conveying arm according to the invention;

FIG. 2 is a schematic top view of the drawing end of the drawing and conveying arm of FIG. 1;

DESCRIPTION OF THE PREFERRED EMBODIMENTS

Figure 3:
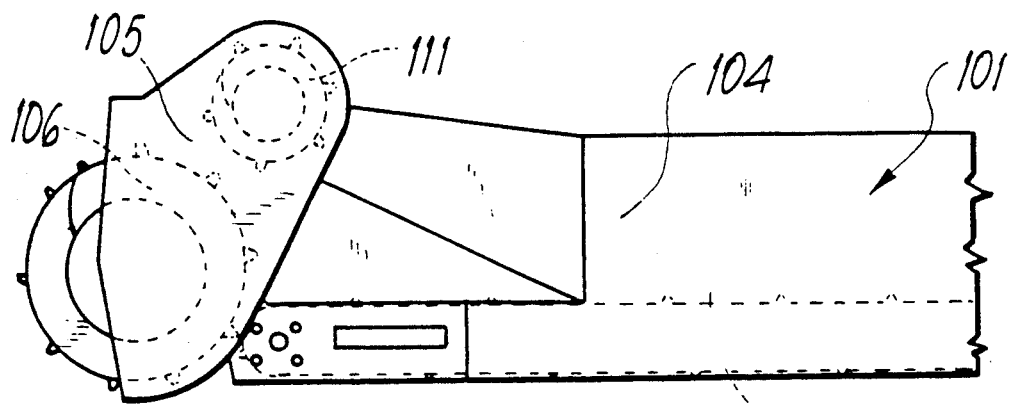
FIG. 3 is a partial side view of the drawing end of a second embodiment of the drawing and conveying arm according to the invention.

With reference to the above FIGS. 1 and 2, an improved drawing and conveying arm comprises, in a first embodiment, a box-like duct 1, preferably made of sheet metal, an outlet end 2 whereof can be articulated to a container and/or to a supporting framework, both of which are not illustrated in the figures.

The articulation of the duct 1 can conveniently be controlled and actuated by adapted fluid actuated cylinders which act between said duct and the structures to which it is articulated.

A conveyor belt 3 is longitudinally provided inside the duct 1 and connects the outlet end 2 to the opposite drawing end 4 having a drawing inlet 5, also preferably made of sheet metal and arranged orthogonally to the axis of the duct 1.

A first large-diameter mill 6, of a per se known type, has conveying scrolls 7 and 8 welded onto a rotating shaft 9 and peripherally provided with shredding cutters 10. The first mill 6 is mounted at said drawing inlet 5, which substantially has the shape of a hopper inclined on one side.

As shown in FIG. 2, the first mill 6 is conveniently perpendicular to the duct 1 and co-operates with a second rotor element or mill 11 which has a smaller diameter and rotates in the opposite direction with respect to said first mill 6; said second mill is also provided with two convergent scrolls 12 and 13 which are welded to a shaft 14 and have shredding blades 15.

Said second mill 11 is arranged rearward with respect to said first mill in a region which is above the end of the conveyor belt 3, and the cutters of one mill are proximate to those of the other mill so as to improve the shredding action and loading.

The two mills 6 and 11 can conveniently be provided with either a single drive or with two separate drives, and the rotation of the second mill 11 can in any case be locked by appropriate locking means 16, such as for example known kinds of locking brakes which act on the mill shaft 14, when the first mill 6 is rotated in the opposite direction with respect to the direction of normal operation in order to free it from any product which might accumulate on the shaft.

This is done to avoid damage to the structure due to the considerable pressures exerted between the two mills when the product clogs them.

Figure 4:
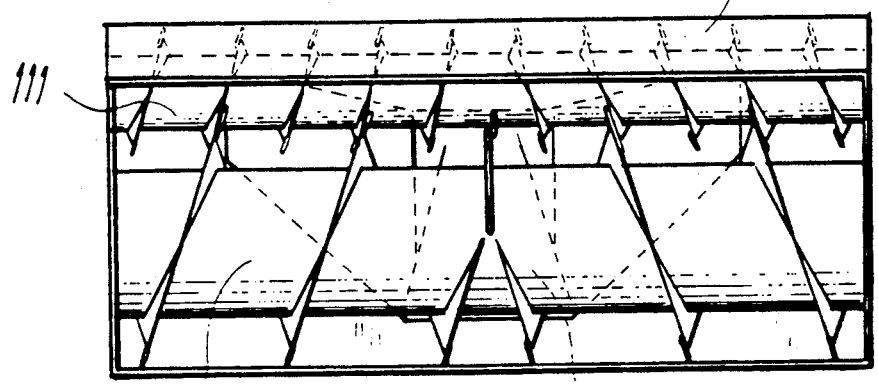
FIG. 4 is a front view of the drawing inlet of the drawing and conveying arm of FIG. 3.

With reference now to FIGS. 3 and 4, the improved drawing and conveying arm comprises, in a second embodiment, a duct 101 with a conveyor belt 103 and having a drawing end 104 provided with a drawing inlet 105.

A first mill 106 and a second mill 111, similar to said previous mills 6 and 11, are located in said drawing inlet 105.

As can be seen in the figures, the second mill 111 is arranged parallel to the first one 106 in a position which is above it and proximate thereto so as to leave a wide inlet for the duct 101 which facilitates loading onto the belt 103.

The drawing inlet 105 extends transversely and reaches below the duct 101 so as to provide an improved drawing of product.

Figure 5:
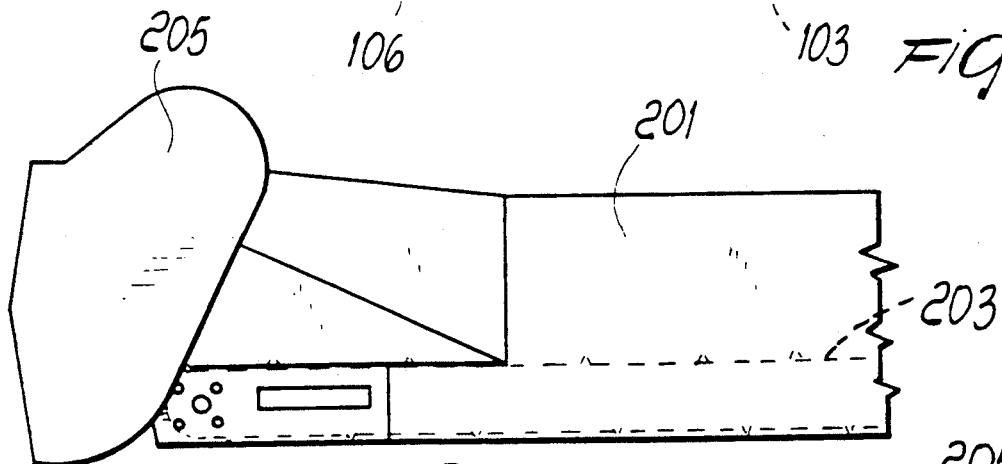
FIG. 5 is a schematic partial side view of the drawing end of a third embodiment of the drawing and conveying arm according to the invention, from which the loading mills have been removed.
Figure 6:
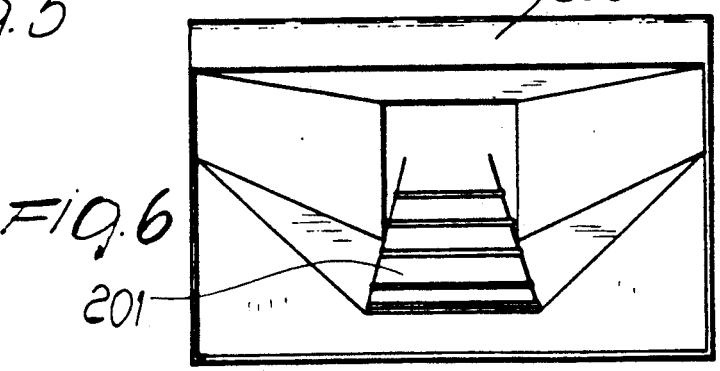
FIG. 6 is a schematic front view of the drawing inlet of FIG. 5.

FIGS. 5 and 6, show a third embodiment of the drawing and conveying arm, which is again composed of a duct 201 with a conveyor belt 203. In this arm the mills can be removed from the drawing inlet 205, which has the same transverse configuration of the previously described inlet 105 but a smaller opening and can be used as scoop for the loading of powdery or granular products, thus becoming a multi-function apparatus.

Figure 7:
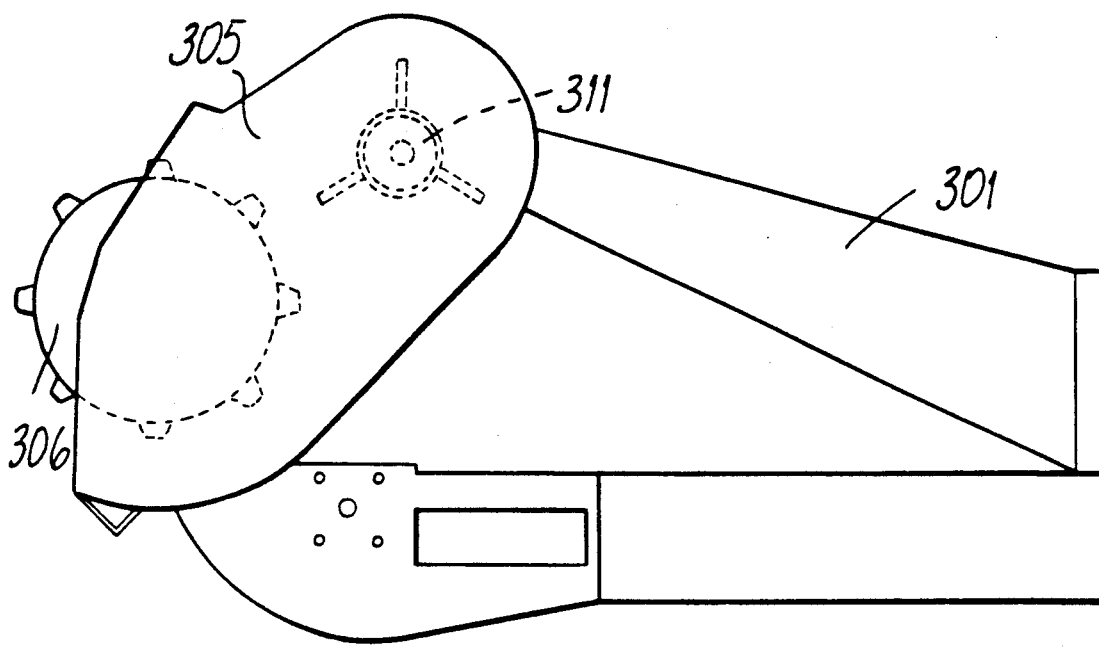
FIG. 7 is a partial side view of the drawing end of a drawing and conveying arm according to a further aspect of the invention.
Figure 8:
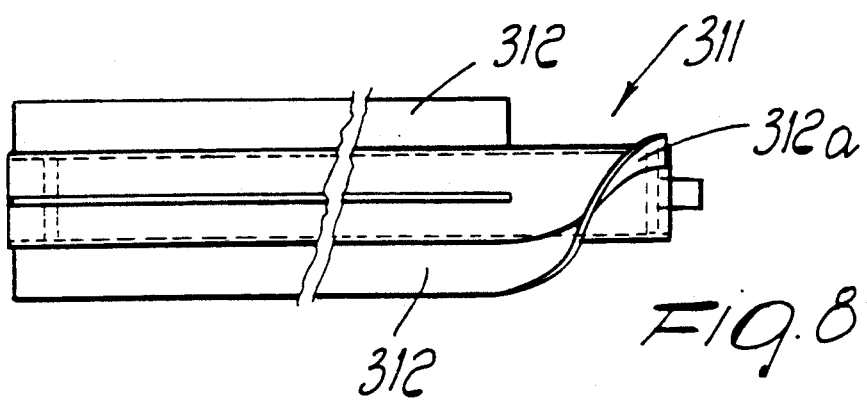
FIGS. 8 and 9 are broken partial front views of the smaller mill of the drawing end, according to a further aspect of the invention, and respectively having helicoidal and straight blades.
Figure 9:
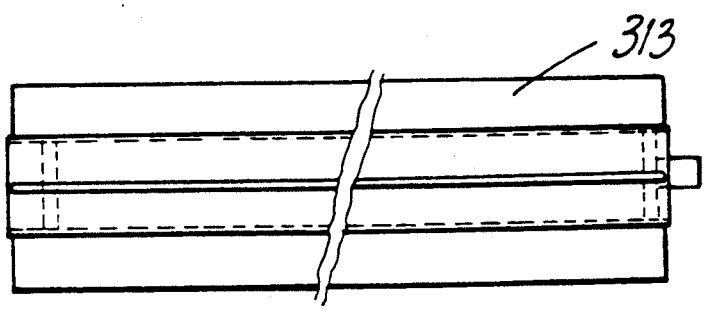

FIGS. 7-9 show a further embodiment of the drawing and conveying arm comprising a duct 301 having a drawing inlet 305 provided with a first larger mill 306 and a second smaller rotating element 311 or 331 substantially in the same relative positions of the previously described mills 106 and 111.

In this case though, the rotating element 311, respectively 331, is provided with shredding blades 312, having helicoidal ends 312a, as shown in FIG. 8, or completely straight shredding blades 313, as shown in FIG. 9.

The helicoidal ends 312a of blades 312 help in converging the drawn material toward the center of the drawing inlet.

From what has been described, the intended aim and objects are achieved, a drawing and conveying arm having been provided which, with the aid of a second counter-rotating mill or rotor which co-operates with the already-known one, achieves an improvement in the shredding and conveying action.

The possibility of removing the mills allows to increase the versatility of the arm and therefore its possibilities of use.

The drawing and conveying arm according to the invention is susceptible to numerous modifications and variations, all of which are within the scope of the inventive concept.

All the details may furthermore be replaced with other technically equivalent elements.

The box-like duct of the arm may naturally be of a fixed type or of a telescopingly extendable type.

In practice, the materials employed, so long as compatible with the contingent use, as well as the dimensions, may be any according to the requirements.

I claim:

1. Drawing and conveying arm comprising a box-like duct means defining an inlet end and an outlet end, a conveyor means being arranged inside said duct means and extending from said inlet end to said outlet end of said duct means, a drawing inlet being arranged at said inlet end of said duct means and being in the form of a hopper, a first mill being provided with shredding cutter means and being rotatably mounted at said drawing inlet, and a second rotor element being rotatably mounted at said drawing inlet in a position toward said outlet end of said duct means with respect to said first mill, said second rotor element being arranged in a parallel position with respect to said first mill and being arranged proximate thereto, said first mill and said second rotor element being rotatable in mutually opposite directions during a working mode of said drawing and conveying arm, said first mill and said second rotor element being removably mounted at said drawing inlet thereby to allow drawing and cutting of fibrous elongated products when said first mill and said second rotor element are mounted at said drawing inlet and to further allow drawing of farinaceous products through said hopper when said first mill and said second rotor element are removed from said drawing inlet, said drawing and conveying arm further comprising locking means for selectively locking a rotation of said second rotor element, whereby a reverse rotation of said first mill opposite to a normal working mode rotation thereof during a locked position of said second rotor element allows to free any accumulated material from between said first mill and said second rotor element.

2. Drawing and conveying arm comprising a box-like duct means defining an inlet end and an outlet end, a conveyor means being arranged inside said duct means and extending from said inlet end to said outlet end of said duct means, a drawing inlet being arranged at said inlet end of said duct means and being in the form of a hopper, a first mill being provided with shredding cutter means and being rotatably mounted at said drawing inlet, and a second rotor element being rotatably mounted at said drawing inlet in a position toward said outlet end of said duct means with respect to said first mill, said second rotor element being arranged in a parallel position with respect to said first mill and being arranged proximate thereto, said first mill and said second rotor element being rotatable in mutually opposite directions during a working mode of said drawing and conveying arm, said first mill and said second rotor element being removably mounted at said drawing inlet thereby to allow drawing and cutting of fibrous elongated products when said first mill and said second rotor element are mounted at said drawing inlet and to further allow drawing of farinaceous products through said hopper when said first mill and said second rotor element are removed from said drawing inlet, said drawing and conveying arm further comprising locking means for selectively locking a rotation of said second rotor element, whereby a reverse rotation of said first mill opposite to a normal working mode rotation thereof during a locked position of said second rotor element allows to free any accumulated material from between said first mill and said second rotor element, said second rotor element comprising a plurality of longitudinal straight blades.

3. Drawing and conveying arm comprising a box-like duct means defining an inlet end and an outlet end, a conveyor means being arranged inside said duct means and extending from said inlet end to said outlet end of said duct means, a drawing inlet being arranged at said inlet end of said duct means and being in the form of a hopper, a first mill being provided with shredding cutter means and being rotatably mounted at said drawing inlet, and a second rotor element being rotatably mounted at said drawing inlet in a position toward said outlet end of said duct means with respect to said first mill, said second rotor element being arranged in a parallel position with respect to said first mill and being arranged proximate thereto, said first mill and said second rotor element being rotatable in mutually opposite directions during a working mode of said drawing and conveying arm, said first mill and said second rotor element being removably mounted at said drawing inlet thereby to allow drawing and cutting of fibrous elongated products when said first mill and said second rotor element are mounted at said drawing inlet and to further allow drawing of farinaceous products through said hopper when said first mill and said second rotor element are removed from said drawing inlet, said drawing and conveying arm further comprising locking means for selectively locking a rotation of said second rotor element, whereby a reverse rotation of said first mill opposite to a normal working mode rotation thereof during a locked position of said second rotor element allows to free any accumulated material from between said first mill and said second rotor element, said second rotor element comprising a plurality of longitudinal straight blades, each of said blades having helicoidal ends.

4. Drawing and conveying arm according to claim 3, wherein said second rotor element has a longitudinal extension which is equal to that of said first mill and has a smaller diameter than said first mill.

5. Drawing and conveying arm according to claim 3, wherein said first mill comprises a shaft to which two opposite conveying scrolls are welded, said shredding cutter means comprising cutters provided peripherally on said scrolls.

* * * * *